March 10, 1959
R. E. KENNEDY
2,877,455
SPEED INDICATOR ALARM SYSTEM
Original Filed May 14, 1956
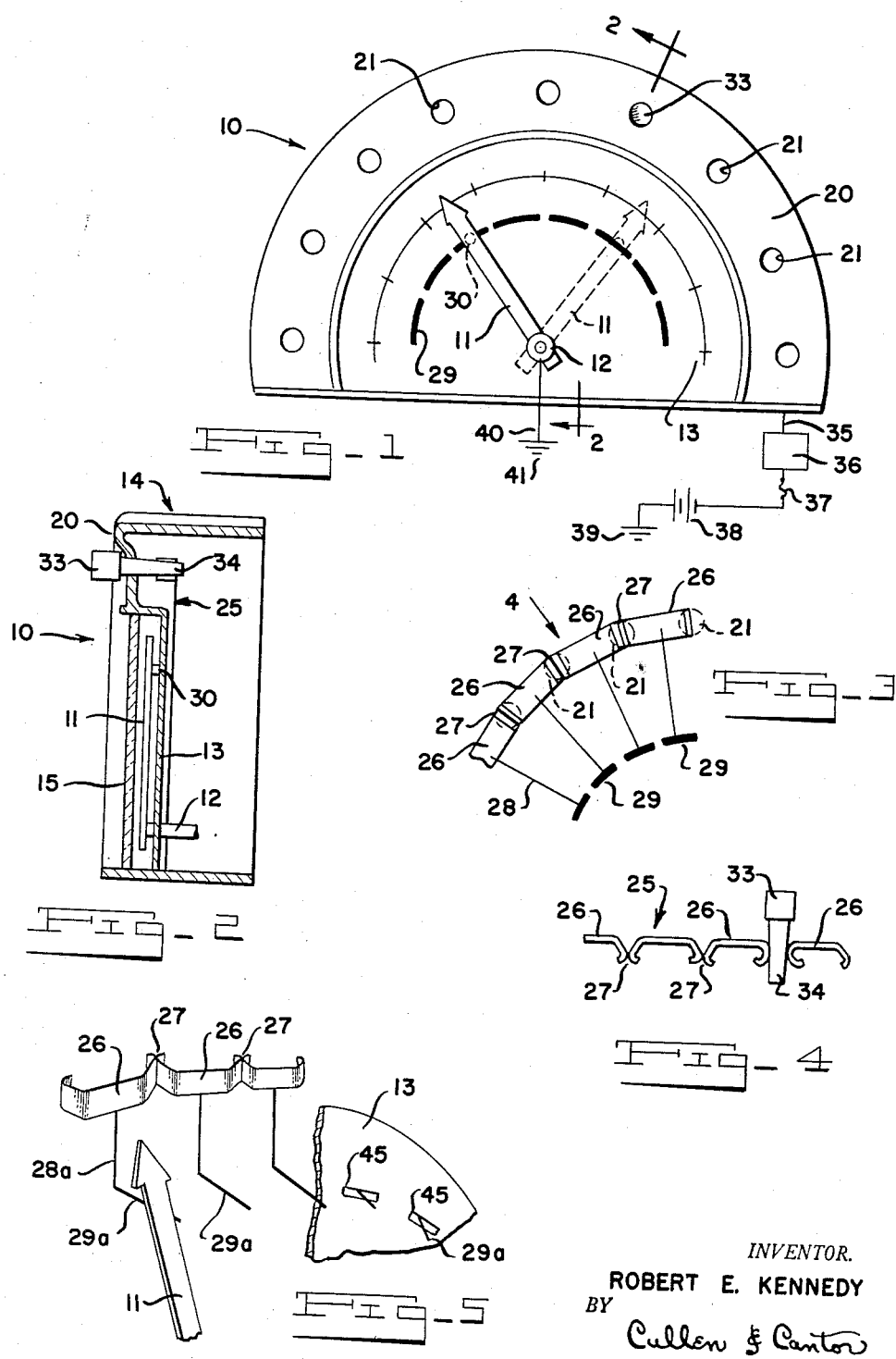
INVENTOR.
ROBERT E. KENNEDY
BY
Cullen & Cantor
ATTORNEYS

United States Patent Office 2,877,455
Patented Mar. 10, 1959

2,877,455
SPEED INDICATOR ALARM SYSTEM

Robert E. Kennedy, Detroit, Mich., assignor of forty percent to Bert S. Kennedy, Detroit, Mich.

Original application May 14, 1956, Serial No. 584,603, now Patent No. 2,825,897, dated March 4, 1958. Divided and this application January 9, 1958, Serial No. 707,914

7 Claims. (Cl. 340—266)

This invention relates to a speed indicator alarm system adapted to be fitted to vehicle speed indicators so that an audible alarm is given when the speed of the vehicle reaches any predetermined point.

This application is a division of my prior application, Serial No. 584,603, filed May 14, 1956, now Patent No. 2,825,897, issued March 4, 1958.

An object of this invention is to form an alarm system wherein the vehicle operator may, by simply inserting a small plug in one of a series of small openings formed in the face of a vehicle speed indicator, select a specific vehicle speed above which the indicator will signal.

Further objects and advantages of this invention will become apparent upon reading the following description of which the attached drawings form a part.

With reference to the drawings, in which:

Fig. 1 is a front view, partially schematic, of a speed indicator alarm system built into a conventional type speed indicator.

Fig. 2 is a cross sectional view taken on arrows 2—2 of Fig. 1.

Fig. 3 is a view of the separable electrical strip and the means for connecting the strip sections to the indicator arm.

Fig. 4 is a view taken on arrow 4 of Fig. 3 to show a top view of the electrical strip with a jack plug inserted between two adjacent section ends.

Fig. 5 is a schematic perspective of a modified means for connecting the strip sections to the indicator arm.

Figs. 1 and 2 show a conventional speed indicator or speedometer 10, provided with the usual indicator arm 11, mounted for pivotal movement upon a shaft 12 which turns in response to the speed of a vehicle. A dial card 13, upon which the usual graduations of speed is printed, is located in back of the indicator arm 11.

The indicator is contained within a casing 14 having a glass window 15 so that the operator of the vehicle may look through the glass to see the speed graduation at which the indicator arm 11 is pointing. The operating mechanism for turning the shaft 12 and thus positioning the indicator arm 11 has been omitted from this description since such mechanisms are well-known to those skilled in the art.

At the peripheral face portion 20 of the casing 14, a series of uniformly spaced openings 21 are provided. These openings correspond to various speeds shown upon the dial face 13.

Behind the face portion 20, an electrical conductive strip generally designated as 25 is positioned (see Figs. 3 and 4) and extends the length of arcuate travel of the speed indicator arm 11. This electrical conductive strip is formed of a plurality of small sections 26 each formed of a thin, narrow, resilient, or springy electrically conductive material, such as springy steel or strap metal, etc. As seen in Fig. 4, the ends of each section are bent at an obtuse angle, out of the plane of the section and towards the next section to form a contact at 27, with the end of the next adjacent section. Thus, the bent ends of each section are normally in physical contact at 27 with the next succeeding section to form a continuous electrical conductor. Each section is connected by a thin wire 28 to an electrically conductive area 29, which may be in the form of a metallic coating printed upon the the dial indicator face 13 of the speed indicator. These areas 29 are separated slightly from each other, and thus, form a non-continuous electrical path along the face of the dial indicator 13.

An electrical contact block 30 secured to the back of the indicator arm 11 is arranged to rub along the path formed by the areas 29 on the dial face. Thus, the contact block 30 contacts the various conductive areas 29, one after the next. But, the spacing between the areas 29 is such that when the contact block passes from one section to the next section, electrical contact is broken for a brief interval in the travel of the block 30.

A jack plug 33 made of a non-conductive material, such as plastics or the like, is formed to fit into the openings 21 and is provided with a shank 34, formed to fit between the contacting section ends so as to separate the contacting ends of any one pair of contacting sections 26. Thus, the electrical circuit formed by the contact strip 25 may be interrupted at any point between succeeding sections by the manual insertion of the jack plug 33 into the desired opening 21, so that the shank 34 separates the section ends.

A complete electrical circuit is formed by means of a wire 35 (see Fig. 1) secured at one end to the conductive strip 25 and then connected to an electrically operated alarm indicator 36, such as a conventional audible common buzzer, which is connected through a fuse 37 to the electrical power source 38 of the vehicle and then to ground 39. The indicator arm 11 is of metallic material or has a metallic coating formed thereon so as to become electrically conductive, whereby the block 30, the arm 11, and then a wire conductor 40 connected to ground 41, form the opposite side of the electrical circuit.

In operation, the operator of the vehicle selects any predetermined speed at which he wishes his alarm to operate. Thus, for example, if he selects the speed of 60 miles per hour, he inserts the jack plug 33 into the opening 21 opposite the indication of 60 miles per hour on his indicator card 13. Thus, below 60 miles per hour, the fluctuations of the indicator arm 11 will have no effect upon the electrical circuit because the conductive strip 25 is interrupted at the 60 mile per hour point. However, when the vehicle reaches 60 miles per hour or exceeds 60 miles per hour, the rubbing block 30, rubbing upon the conductive area 29, makes contact with the portion of the strip 25 between the jack plug and the wire 35 and thus closes the circuit and causes the alarm 36 to operate. The alarm 36 will continue ringing as long as the arm 11 continues either at 60 miles per hour or above 60 miles per hour.

Fig. 5 illustrates a modification of the means for electrically connecting the indicator arm 11 to the individual strip sections 26. Here, a springy wire 28a is connected at one end to a section 26, with its opposite end 29a being bent to extend outwardly of the card 13, through slots 45, into the path of travel of the indicator arm. Thus, the arm contacts one wire 29a at a time, during travel, and the wire is pushed out of the path of travel by the moving arm to then resiliently return to its original position.

This invention may be further developed within the scope of the following attached claims and accordingly it is desired that the foregoing description be read as being illustrative of embodiments of my invention and not in a strictly limiting sense.

I claim:

1. In an indicator having a pivotally mounted, normally movable, indicator arm, the improvement comprising means for operating an alarm during certain predetermined positions of the indicator arm, said means comprising an electrical conductive strip arranged along the arc of travel of the indicator arm; said strip being formed of a number of separate sections with each section being in end to end contact with the next succeeding section and the sections being formed of a resilient material so that any pair of contacting section ends may be separated to interrupt the electrical continuity of the strip, but when not separated the pair of ends will return to their normal contacting position; a non-conductive plug formed for removable positioning between any pair of contacting section ends to separate these ends; and an electrical circuit including the indicator arm, and means for electrically connecting the indicator arm to that section of the strip corresponding to the position of the arm, and continuing through the strip to one end thereof, so that when the continuity of the strip is broken by the plug the electrical circuit from the indicator arm to said one end of the strip is completed when the indicator arm moves to a position where it is electrically connected with a section of the strip located between the plug and said one end of the strip.

2. A construction as defined in claim 1, and wherein a cover plate is provided for the speed indicator and the electrical conductive strip is located behind the cover plate; said cover plate being provided with openings over each pair of contacting section ends for the insertion of the jack plug through any one opening and between the section ends behind the opening.

3. A construction as defined in claim 1, wherein said means for connecting the indicator arm to the strip consists of closely spaced areas of electrical conductive material arranged behind and near the indicator arm, each area being electrically connected to one section of the conductive strip; a contact block on the back of the indicator arm and the areas of conductive material forming a path over which the contact block rubs as the indicator arm moves in response to speed.

4. A construction as defined in claim 1, and said sections forming the conductive strip each consisting of a narrow flat sheet of metallic electrical conductive material and having the ends thereof bent at an obtuse angle away from the sheet with the ends each terminating at a portion arranged to contact a similar portion of the next section.

5. A construction as defined in claim 1, and wherein said means for connecting the indicator arm to the strip part, consists of a springy wire connected at one end thereof to a strip part and the opposite end thereof extending into the path of travel of the indicator arm for contact with the indicator arm.

6. A vehicle speed indicator alarm system for use in a speed indicator having a pivotally mounted indicator arm which is movable in response to the varying speeds of the vehicle, comprising an electrically conductive strip arranged along the arc of travel of the indicator arm; said strip being formed of a plurality of sections each formed of thin, narrow, elongated, springy sheet metal, and each section having its ends bent out of the plane of the sheet and normally arranged in physical contact with the adjacent end of the next adjacent section, a non-conductive plug arranged for insertion between any two contacting ends, with said two ends normally resiliently returning back into physical contact upon removal of the plug; and an electrical circuit including an electrically actuated alarm electrically connected to one end of the strip, the strip, the indicator arm, and a plurality of contact means, each electrically connected to one of the strip sections and each arranged in the path of travel of the arm to make physical contact, one after the other, with the indicator arm during the travel of the arm to thereby complete the circuit when the arm is in electrical contact with that part of the strip located between the plug and that end of the strip which is connected to the alarm.

7. A construction as defined in claim 6, and said contact means each consisting of a springy wire having an end connected to one strip section and an opposite end arranged in the path of travel of the indicator arm for contact with the arm as the arm passes that end.

References Cited in the file of this patent

UNITED STATES PATENTS

| | | |
|---|---|---|
| 807,568 | Mitchell | Dec. 19, 1905 |
| 1,547,909 | Earle | July 28, 1925 |
| 2,523,352 | Behr | Sept. 26, 1950 |
| 2,825,897 | Kennedy | Mar. 4, 1958 |